United States Patent
Kabir

(10) Patent No.: US 10,094,733 B2
(45) Date of Patent: Oct. 9, 2018

(54) METHODS FOR TESTING SHAPE-MEMORY ALLOY COUPLERS FOR OIL AND GAS APPLICATIONS

(71) Applicant: Cameron International Corporation, Houston, TX (US)

(72) Inventor: Omar M. Kabir, Houston, TX (US)

(73) Assignee: Cameron International Corporation, Houston, TX (US)

( * ) Notice: Subject to any disclaimer, the term of this patent is extended or adjusted under 35 U.S.C. 154(b) by 589 days.

(21) Appl. No.: 14/550,873

(22) Filed: Nov. 21, 2014

(65) Prior Publication Data

US 2016/0146695 A1    May 26, 2016

(51) Int. Cl.
| | |
|---|---|
| G01M 3/00 | (2006.01) |
| G01M 5/00 | (2006.01) |
| G01M 7/02 | (2006.01) |
| G01M 7/08 | (2006.01) |

(52) U.S. Cl.
CPC .......... *G01M 3/002* (2013.01); *G01M 5/0033* (2013.01); *G01M 5/0041* (2013.01); *G01M 5/0066* (2013.01); *G01M 7/02* (2013.01); *G01M 7/08* (2013.01)

(58) Field of Classification Search
CPC .................................................. G01M 3/002
See application file for complete search history.

(56) References Cited

U.S. PATENT DOCUMENTS 3,857,087 A    12/1974   Jones
8,429,466 B2    4/2013   Laengert et al.

OTHER PUBLICATIONS

Lewis, Peter et al. "Shape Memory Alloy: Low-Cost Manufacturing for the Oil and Gas Industry", Offshore Technology Conference, Houston, Texas, May 2013.*
ASTM Designation: F1387-99, "Standard Specification for Performance of Piping and Tubing Mechanically Attached Fittings", May 2012.*
ASTM Designation: G71-81, "Standard Guide for Conducting and Evaluating Galvanic Corrosion Tests in Electrolytes", May 2009.*
SMABook11-08, retrieved from www.aerofit.com on Apr. 10, 2014, 84 pgs.

* cited by examiner

*Primary Examiner* — Paul West
(74) *Attorney, Agent, or Firm* — Chamberlain Hrdlicka

(57) ABSTRACT

A method of testing a shape-memory alloy (SMA) coupler for use within an oil and gas environment at an operating pressure includes testing a first specimen of an SMA coupler design for the operating pressure according to a first test sequence comprising a first plurality of tests and testing a second specimen of the SMA coupler design for the operating pressure according to a second test sequence comprising a second plurality of tests. The method further includes approving the SMA coupler design for use within an oil and gas application at the operating pressure if the first specimen passes each of the first plurality of tests of the first test sequence and the second specimen passes each of the second plurality of tests of the second test sequence.

15 Claims, 3 Drawing Sheets

METHODS FOR TESTING SHAPE-MEMORY ALLOY COUPLERS FOR OIL AND GAS APPLICATIONS

BACKGROUND

To meet the demand for oil and gas resources in the oil and gas industry, companies often invest significant amounts of time and money in searching for and extracting oil, natural gas, and other subterranean resources from the earth. Particularly, once a desired resource is discovered below the surface of the earth, drilling and production systems are often employed to access and extract the resource. These systems may be located onshore or offshore depending on the location of a desired resource. Further, such systems generally include a flow equipment completion system that includes production trees, blowout preventers, accumulator systems, many types of control systems, wellhead assemblies through which the resource may be extracted, in addition to other types of flow equipment. These flow completion systems may include a wide variety of components, such as various piping, tubing, casings, hangers, valves, fluid conduits, and the like, that control drilling and/or extraction operations.

As such, the oil and gas industry depends highly upon the use of pipes, tubulars, and other similar types of conduits for reliability, economic practicality, and safety. These conduits come in all types of sizes and dimensions, such as depending on the intended use and environment, and may be coupled to each other using several different techniques. Larger conduits are more commonly used to transport drilling fluids for drilling purposes or oil and gas for production purposes, whereas smaller conduits are more commonly used for pressure control type purposes, such as by supplying pressurized hydraulic fluid for various functions, valves, or tools. To connect these conduits with each other, the conduits may be threaded into engagement with each other, may be bolted to each other, such as through flanges, and/or may be permanently connected to each other by welding the conduits to each other.

Oilfield equipment and tubulars are already exposed to extreme conditions, and with the increased development in the petroleum industry, these conditions are only pushing the fluid handling capabilities of the equipment and tubulars more and more. For example, wells are now deeper with higher pressures, many are subsea in cold and higher pressure environments and/or may be in highly corrosive areas with minimal accessibility, may be contained within an earthquake fault zone, and/or may have other harsh conditions. These conditions and circumstances only push the performance requirements for the equipment and tubulars higher and higher. Accordingly, these oil and gas tubulars are scientifically evaluated using various tests to simulate service conditions, including testing for axial load (tension or compression), pressure (internal pressure or external pressure), temperature, and bending loads, for determining carrying capacity and limits of the tubulars in accordance with relevant U.S. and international standards and R & D requirements. However, these tests are designed and specific to the nature and configuration of the tubulars and tubular connections themselves, and any new development with respect to the tubulars and tubular connections may require reconsideration on how the scientific evaluations and tests are conducted. As such, it remains a priority to not only continue to develop tubulars and tubular connections, but also the testing methods with respect to the tubulars and tubular connections.

BRIEF DESCRIPTION OF THE DRAWINGS

For a detailed description of embodiments of the subject disclosure, reference will now be made to the accompanying drawings in which.

DETAILED DESCRIPTION

Figure 1A:
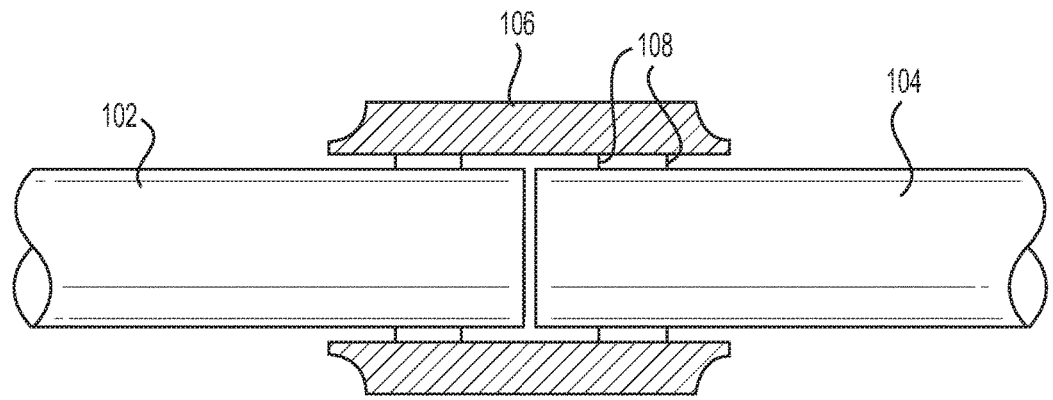
FIGS. 1A and 1B show schematic views of an SMA coupler coupling two tubings to each other in accordance with one or more embodiments of the present disclosure.

The following discussion is directed to various embodiments of the invention. The drawing figures are not necessarily to scale. Certain features of the embodiments may be shown exaggerated in scale or in somewhat schematic form and some details of conventional elements may not be shown in the interest of clarity and conciseness. The embodiments disclosed should not be interpreted, or otherwise used, as limiting the scope of the disclosure, including the claims. It is to be fully recognized that the different teachings of the embodiments discussed below may be employed separately or in any suitable combination to produce desired results. In addition, one skilled in the art will understand that the following description has broad application, and the discussion of any embodiment is meant only to be an illustration of that embodiment, and not intended to intimate that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but are the same structure or function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. In addition, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular and/or any angle that is not zero to the central axis. The use of "top," "bottom," "above," "below," and variations of these terms is made for convenience, but does not require any particular orientation of the components.

In accordance with one or more embodiments, the present disclosure relates to the use of a coupler to connect two or more conduits or tubulars to each other, in which the coupler includes or is formed of a shape-memory alloy (SMA). A shape-memory alloy is an alloy that may be formed into an original shape and then cooled to increase the ductility of the alloy and enable the alloy to be deformed. Upon subsequent heating of the alloy, the alloy will then return to the original shape. As such, the original shape may be any form or shape that may be formed or constructed, such as without unnecessary restriction.

Figure 1B:
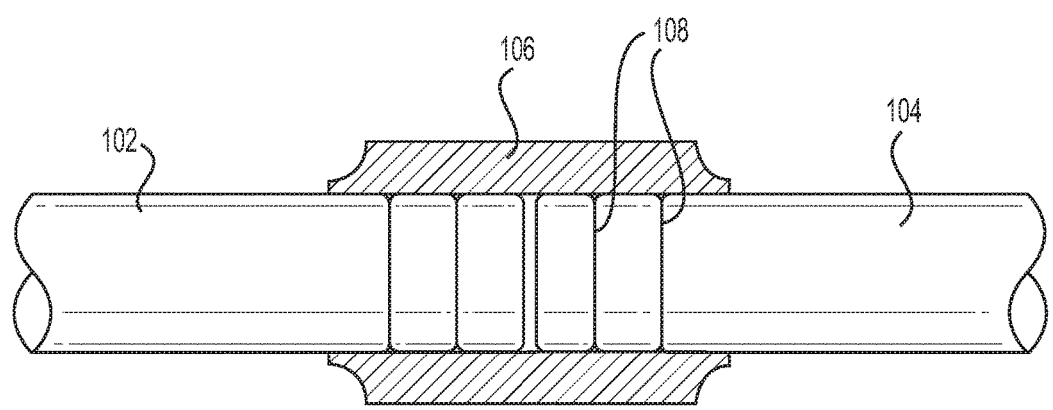

Accordingly, referring now to FIGS. 1A and 1B, schematic views of coupling a first tubing 102 and a second tubing 104 to each other using an SMA coupler 106 in accordance with one or more embodiments of the present disclosure are shown. The SMA coupler 106 may include one or more grooves 108 or ribs formed therein to facilitate engagement between an internal surface of the SMA coupler 106 with external surfaces of the first tubing 102 and the second tubing 104, such as when the SMA coupler 106 expands and contracts with respect to the first tubing 102 and the second tubing 104. Further, the SMA coupler may be formed of any shape-memory alloy known in the art, such as a copper-aluminum-nickel alloy or a nickel-titanium alloy (e.g., Tinel).

The SMA coupler 106 may initially be cooled, such as within liquid nitrogen, and in this cooled low-temperature state, the internal diameter of the SMA coupler 106 may then be expanded. For example, a mandrel may be introduced into the SMA coupler 106 in the low-temperature state to mechanically expand the SMA coupler 106, thereby enabling the SMA coupler 106 to fit over the ends of the first tubing 102 and the second tubing 104 that are to be coupled to each other, as shown in FIG. 1A. After positioning the SMA coupler 106 over the ends of the first tubing 102 and the second tubing 104, the SMA coupler 106 is then allowed to warm, in which the internal diameter of the SMA coupler may then contract back to the original smaller size, as shown in FIG. 1B. This contraction may then create a tight fitting metal-to-metal seal between the SMA coupler 106 and then ends of the first tubing 102 and the second tubing 104 to couple the first tubing 102 and the second tubing 104 to each other.

In one or more embodiments, the SMA coupler 106 is shown for simplicity of description and may be equal on both ends with a fixed diameter throughout SMA coupler 106. However, the present disclosure is not so limited, as an SMA coupler in accordance with the present disclosure may be constructed to any shape or dimensions to couple tubular components together. Further, for simplicity of description purposes, the tubings are shown as mating end-to-end within the SMA coupler, but it should be understood that the SMA coupler and the adjoining tubings or bodies could be configured such that one of the tubings may fit inside the other based on predetermined desired interferences.

Further, an SMA material in accordance with the present disclosure may include or be made from a type that, when heated, becomes plyable, and when cooled, expands and reverts to the original shape. Tinel (Titenium with Nickel and iron composition) is used and described herein for simplicity of description, but the present disclosure is not so limited, as other compositions that revert to expanding to the original shape are contemplated within the scope of the present disclosure.

Furthermore, the present disclosure relates an SMA coupler for use within an oil and gas environment. As such, those having ordinary skill in the art will appreciate that a coupler in accordance with the present disclosure may also be referred to as a fitting, elbow, reducer, and/or any other type of component that may be used couple multiple tubulars, pipes, conduits, and/or any other elements together, such as for the purpose of transferring fluid. As such, the present disclosure refers to such a component throughout the remainder of the present disclosure as a "coupler," but the present disclosure is not so limited.

Accordingly, disclosed herein are one or more methods related to testing and approving an SMA coupler for use within an oil and gas environment. As mentioned above, the conditions and environments experienced within the oil and gas industry may be extreme and in remote locations, such as more so than those found or experienced within other industries (e.g., the aerospace or automotive industries). As such, the testing and approval process for qualifying an SMA coupler for use within an oil and gas environment may be even more rigorous than that of other industries. In one or more embodiments, an SMA coupler in accordance with the present disclosure may be used to carry or transport hydraulic fluid (e.g., liquid and/or gaseous substances) for hydraulic and/or pneumatic control and/or sensing purposes within equipment or devices that are used on subsea, on the surface, and/or during drilling Examples of such equipment and devices may include hydraulic power units, fluid mixing units, diverter control units, accumulator racks, subsea control pods, completion equipment, in addition to other devices used within subsea and/or surface environments.

In one embodiment, a method of testing an SMA coupler for use within an oil and gas environment may include testing a first specimen of an SMA coupler design for an operating pressure according to a first test sequence, the first test sequence comprising a first plurality of tests, testing a second specimen of the SMA coupler design for the operating pressure according to a second test sequence, the second test sequence comprising a second plurality of tests, and approving the SMA coupler design for use within an oil and gas application at the operating pressure if the first specimen passes each of the first plurality of tests of the first test sequence and the second specimen passes each of the second plurality of tests of the second test sequence. In another embodiment, a method of testing an SMA coupler for use within an oil and gas environment may include testing a plurality of specimens of an SMA coupler design for an operating pressure according to a plurality of test sequences, the plurality of test sequences comprising a plurality of tests with each of the plurality of test sequences are different from each other, and approving the SMA coupler design for use within an oil and gas application at the operating pressure if each of the plurality of specimens pass each of the plurality of tests of the plurality of test sequences.

Further, in another embodiment, a method of testing an SMA coupler for use within an oil and gas environment may include testing an SMA coupler design at an operating pressure, a proof pressure, and a burst pressure according to a plurality of test sequences, the plurality of test sequences each different from each other with the burst pressure larger than the proof pressure and the proof pressure larger than the operating pressure, and approving the SMA coupler design for transporting fluid within an oil and gas application at the operating pressure if each of the plurality of specimens pass each test of the plurality of test sequences. The tests for the SMA coupler may include one or more of the following: a hydrostatic proof test, a temperature test, a gas leak test, a shock test, a vibration test, a proof pressure test, a flexure fatigue test, an impulse pressure test, a burst pressure test, a coupler tensile test, a material tensile test, a galvanic corrosion test, a salt spray test, a dimensional test, a visual inspection test, and a non-destructive examination test.

As mentioned above, testing an SMA coupler design may include or incorporate testing one or more specimens of the SMA coupler design. For example, one or more specimens of an SMA coupler design may be tested, such as to failure, to determine properties, lifespan, usefulness, and/or other characteristics of an SMA coupler design. Accordingly, provided in Table 1 below is an example of one or more test assemblies that may be assembled, such as described above with respect to FIGS. 1A and 1B. Further, though only 316L, 304L, and Super Duplex materials are shown and described below, the present disclosure is not so limited, as any tubing material of construction, such as Inconel, Hastloy, and/or any other tubing material may be used without departing from the scope of the present disclosure.

TABLE 1

| Test Assembly | Material | Tubular Outside Diameter (in/mm) | Tubular Nominal Wall Thickness (in/mm) | Tubular Pressure Rating under B31.3 Code (PSI) |
| --- | --- | --- | --- | --- |
| 1 | 316L/304L | 0.25/6.35 | 0.049/1.24 | 8767 |
| 2 | 316L/304L | 0.25/6.35 | 0.065/1.65 | 13113 |
| 3 | Grade UNS S32750 (Super Duplex) | 0.25/6.35 | 0.065/1.65 | 31800 |
| 4 | 316L/304L | 0.75/19.05 | 0.104/2.64 | 5766 |
| 5 | 316L/304L | 0.75/19.05 | 0.125/3.18 | 6319 |
| 6 | 316L/304L | 0.75/19.05 | 0.156/3.96 | 9437 |
| 7 | Grade UNS S32750 (Super Duplex) | 0.75/19.05 | 0.12/3.05 | 18190 |
| 8 | 316L/304L | 1.5/38.1 | 0.12/3.05 | 3121 |
| 9 | 316L/304L | 1.5/38.1 | 0.134/3.404 | 3481 |
| 10 | Grade UNS S32750 (Super Duplex) | 1.5/38.1 | 0.12/3.05 | 13053 |

Table 2, provided below, provides one or more material properties of the materials identified in Table 1.

TABLE 2

| Material | Yield at 68° F. (Ksi) | Yield at 350° F. (Ksi) | Yield at 68° F. (Ksi) | Elongation (%) |
| --- | --- | --- | --- | --- |
| SMA | 64.5 | 64 | 111 | 23 |
| 316L | 30 | 16.3 | 45 | 40 |
| Grade UNS S32750 (Super Duplex) | 80 | 61 | 112 | 25 |

Further, Table 3, provided below, provides one or more properties of an SMA coupler that may be incorporated within one or more of the test assemblies identified in Table 1.

TABLE 3

| Tubular Outside Diameter (in) | Expanded Minimal Coupler Inside Diameter (in) | Coupler Outside Diameter (in) | Coupler Length (in) |
| --- | --- | --- | --- |
| 0.25 | 0.254 | 0.434 | 0.65 |
| 0.75 | 0.758 | 1.167 | 1.89 |
| 1.5 | 1.509 | 2.076 | 3.79 |

In accordance with one or more embodiments of the present disclosure, one or more specimens of an SMA coupler design may then be tested according to one or more test sequences. When testing to approve a coupler design for a particular application or industry, each test may have previously been conducted or run individually, such as conducting an individual test with an individual specimen to determine if the specimen of the coupler design passes the one test. However, in the present disclosure, a specimen of a coupler design may be tested according to one or more test sequences, in which the test sequences may each include multiple tests. When in use within an oil and gas environment, a coupler may be exposed to multiple stressors at any given moment. For example, a coupler may be exposed to an environment that is corrosive, such as from exposure to saltwater and/or contact with other materials, may experience vibrations from currents or tides and/or pulsations from liquid hammer type effects, and may experience extreme temperatures, in addition to other elements. As such, a specimen of an SMA coupler design for use within an oil and gas application may be tested according to one or more test sequences such that the specimen may experience multiple stressors, such as in parallel or in series, to more closely simulate the oil and gas environment.

Accordingly, tables 4 and 5 provided below may be used to identify one or more test sequences that may be used to test a specimen of an SMA coupler design, or a test assembly including a specimen of an SMA coupler design.

TABLE 4

| Test | Test Sequence 1 | Test Sequence 2 | Test Sequence 3 | Test Sequence 4 | Test Sequence 5 | Test Sequence 6 |
| --- | --- | --- | --- | --- | --- | --- |
| Gas Leak Test | 1 | 1 | 1 |  | 1 | 1 |
| Hydrostatic Proof Test |  |  | 2 |  |  |  |
| Temperature Test |  |  |  |  | 2 |  |
| Shock Test |  |  |  |  |  | 2 |
| Vibration Test |  |  |  |  |  | 3 |
| Proof Pressure Test |  | 2 |  |  |  |  |
| Flexure Fatigue Test |  | 3 |  |  |  |  |
| Impulse Pressure Test |  |  |  | 3 |  |  |
| Burst Pressure Test |  |  |  | 6 |  |  |
| Coupler Tensile Test |  | 2 |  |  |  |  |
| Material Tensile Test |  |  |  |  |  | 1 |

TABLE 4-continued

| Test | Test Sequence 1 | Test Sequence 2 | Test Sequence 3 | Test Sequence 4 | Test Sequence 5 | Test Sequence 6 |
|---|---|---|---|---|---|---|
| Galvanic Corrosion Test | | | | | 3 | |
| Salt Spray Test | | | 5 | | | |
| Dimensional Test | | | | | | |
| Visual Inspection Test | | | | | | |
| Non-Destructive Examination Test | 4 | | 4 | | | 4 |

TABLE 5

Test Sequence for Test Assemblies

| Tests | Test Assembly 1 | Test Assembly 2 | Test Assembly 3 | Test Assembly 4 | Test Assembly 5 | Test Assembly 6 |
|---|---|---|---|---|---|---|
| 1 | Gas Leak Test | Gas Leak Test | Gas Leak Test | Material Tensile Test | Gas Leak Test | Gas Leak Test |
| 2 | Proof Pressure Test | Coupler Tensile Test | Hydrostatic Proof Test | | Temperature Test | Shock Test |
| 3 | Flexure Fatigue Test | | Impulse Pressure Test | | Non-Destructive Examination Test | Vibration Test |
| 4 | Non-Destructive Examination Test | | Non-Destructive Examination Test | | Galvanic Corrosion Test | Non-Destructive Examination Test |
| 5 | | | Burst Pressure Test | | | Salt Spray Test |

As shown above, an SMA coupler, or more particularly one or more specimens of an SMA coupler design, and a test assembly including an SMA coupler may be subject to a number of tests. For example, Table 4 identifies sixteen different tests that an SMA coupler may be subject to when testing an SMA coupler for use within an oil and gas environment. Those having ordinary skill in the art will appreciate that additional or fewer tests may be incorporated into the protocol when testing and approving an SMA coupler design for use within an oil and gas environment. As such, one or more test sequences may be developed, such as from the tests identified above, which also may include or exclude one or more tests, from each of the tests used to approve an SMA coupler design for use within an oil and gas environment.

For example, with respect to Table 4 and in accordance with one or more embodiments of the present disclosure, sixteen tests may be identified, in which six test sequences may be created and developed for testing one or more specimens of an SMA coupler design. Though these specific test sequences may be varied to each include additional or fewer tests, or have tests switched amongst test sequences, the six test sequences identified are as follows: a first specimen of an SMA coupler design may be subject to testing according to a first test sequence that includes a gas leak test, a proof pressure test, a flexure fatigue test, and a non-destructive examination test; a second specimen of the SMA coupler design may be subject to testing according to a second test sequence that includes a gas leak test, and a coupler tensile test; a third specimen of the SMA coupler design may be subject to testing according to a third test sequence that includes a gas leak test, a hydrostatic proof test, an impulse pressure test, a non-destructive examination test, a salt spray test, and a burst pressure test; a fourth specimen may be subject to testing according to a fourth test sequence that includes a material tensile test; a fifth specimen of the SMA coupler design may be subject to testing according to a fifth test sequence that includes a gas leak test, a temperature test, and a galvanic corrosion test; a sixth specimen of the SMA coupler design may be subject to testing according to a sixth test sequence that includes a gas leak test, a shock test, a vibration test, and a non-destructive examination test. Accordingly, in one or more embodiments, the combination of the tests included within the test sequences may include all of the tests identified in Table 4. Further, as mentioned above, additional or fewer tests may be identified for testing an SMA coupler design, in which one or more of the test sequences may be adapted to include each of the additional or fewer tests.

Figure 2:
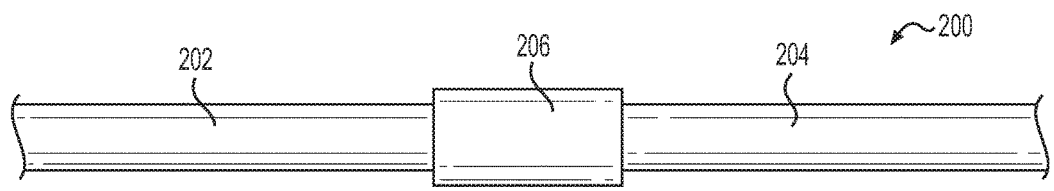
FIG. 2 shows an example of a test assembly including an SMA coupler in accordance with one or more embodiments of the present disclosure.
Figure 3:
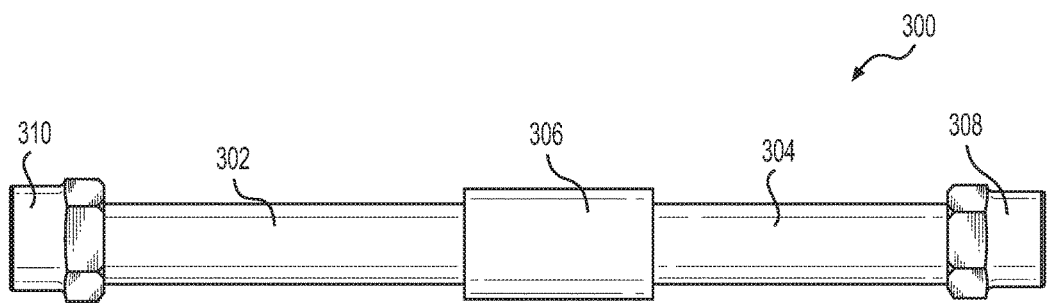
FIG. 3 shows an example of a test assembly including an SMA coupler in accordance with one or more embodiments of the present disclosure.
Figure 4:
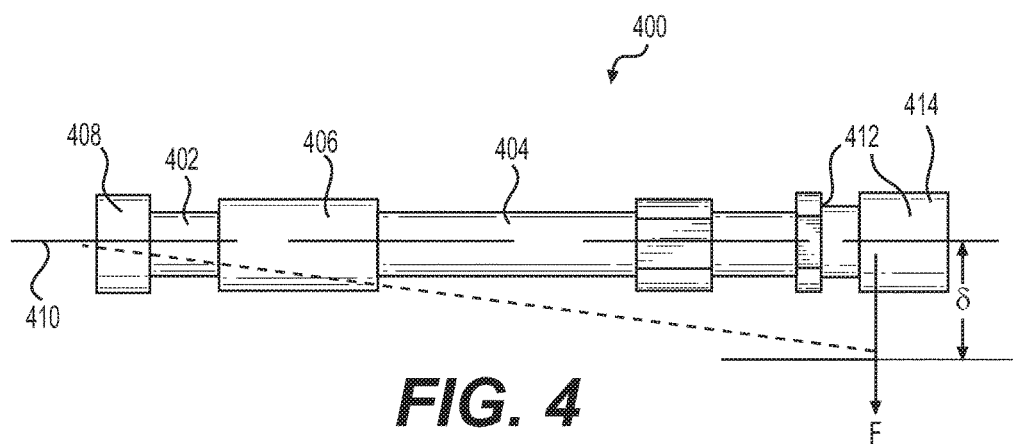
FIG. 4 shows an example of a test assembly including an SMA coupler in accordance with one or more embodiments of the present disclosure.

Referring now to FIGS. 2-4, multiple perspective views of one or more test assemblies including one or more specimens of an SMA coupler design in accordance with one or more embodiments of the present disclosure are shown. In particular, FIG. 2 shows an example of a test assembly 200, in which a first tubing 202 and a second tubing 204 are coupled to each other with a specimen 206 of an SMA coupler design. In one or more embodiments, the test assembly 200 shown in FIG. 2 may be used when conducting one or more tests, such as when conducting a non-destructive examination test. FIG. 3 shows an example of a test assembly 300, in which a first tubing 302 and a second tubing 304 are coupled to each other with a specimen 306 of an SMA coupler design. A test nut 308 may be coupled to one end of the test assembly 300, such as to the end of the second tubing 304, to prevent pressurized air, liquid, or any other fluid from escaping from the test assembly 300. Further, a fitting 310 may be coupled to another end of the test assembly 300, such as to the end of the first tubing 302, to couple the test assembly 300 to the appropriate equipment when testing the test assembly 300. As such, in one or more embodiments, the test assembly 300 shown in FIG. 3 may be used when conducting one or more tests, such as when conducting a gas leak test, a hydrostatic proof test, a temperature test, a dimensional test, a visual inspection test, a shock test, a vibration test, a proof pressure test, an impulse pressure test, a burst pressure test, a coupler tensile test, a galvanic corrosion test, and/or a salt spray test.

FIG. 4 shows an example of a test assembly 400, in which a first tubing 402 and a second tubing 404 are coupled to each other with a specimen 406 of an SMA coupler design. The test assembly 400 may be used when conducting one or more tests, such as when conducting a flexure fatigue test. As such, the test assembly 400 may be coupled at one end of the test assembly, such as at the end of the first tubing 402, to a fixed frame 408 of test equipment, in which this end may also be used as an inlet to communicate pressurized fluid 410 into the test assembly 400. Further, one or more fittings 412, such as a swivel 414, may be coupled to another end of the test assembly 400, such as to the end of the second tubing 404. A force F may be applied to the end of the test assembly 400, such as at the swivel 414, to impart a deflection δ upon the test assembly 400.

One or more tests in accordance with the present disclosure are described below. Accordingly, unless specified otherwise, one or more of the tests may be conducted using hydraulic fluid, such as MIL-PRF-83282 hydraulic fluid, may be conducted at ambient temperature of 77±18° F., and may be conducted within ±5% tolerance of the internal pressure to be applied. Further, one or more tests may be conducted with respect to an operating pressure, a proof pressure, and/or a burst pressure. The burst pressure may be larger than the proof pressure, and the proof pressure may be larger than the operating pressure. For example, the proof pressure may be about 1.5 times that of the operating pressure, and the burst pressure may be between about 3 times and 4 times that of the operating pressure. In one embodiment, the operating pressure may be about 6,000 psi, the proof pressure may be about 9,000 psi, and the burst pressure may be about 24,000 psi. Those having ordinary skill in the art will appreciate that, though specific temperatures, pressures, and ranges are shown and discussed above, the present disclosure is not so limited, as other values may be used without departing from the present disclosure.

Gas Leak Test

In one or more embodiments, a gas leak test may be conducted upon a specimen of an SMA coupler design, and more particularly a test assembly including a specimen of an SMA coupler design, in accordance with the present disclosure. For example, a gas leak test may be conducted using a configuration of a test assembly similar to that shown in FIG. 3. The gas leak test may be conducted prior to any subsequent testing, such as to assure that the test assembly is properly assembled. In one or more embodiments, during a gas leak test, the test assembly may be connected to a regulated air or nitrogen gas source and immersed in water. The gas pressure may then be increased to 1.5 times the test working pressure or 1000 psi, whichever is lower. This pressure may then be held for five minutes, while the test assembly is observed for leakage. To be accepted and/or pass the gas leak test, no gas leakage may be observed coming from the test assembly during the gas leak test period. In addition, the coupler and/or test assembly may be dimensionally checked (e.g., length & outer diameter) to ensure no deformation has occurred during testing process that may lead into eventual leakage of the coupler.

Hydrostatic Proof Test

A hydrostatic proof test may be conducted upon a specimen of an SMA coupler design, and more particularly a test assembly including a specimen of an SMA coupler design, in accordance with one or more embodiments of the present disclosure. For example, a hydrostatic proof test may be conducted using a configuration of a test assembly similar to that shown in FIG. 3. In one or more embodiments, during a hydrostatic proof test, the test assembly may be connected to a regulated hydraulic source and filled with hydraulic fluid. Pressure may then be increased to 1.5 times the proof pressure and held for five minutes while the test assembly is observed for leakage. To be accepted and/or pass the gas leak test, no gas leakage may be observed coming from the test assembly during the hydrostatic proof test period. In addition, the coupler and/or test assembly may be dimensionally checked (e.g., length & outer diameter) to ensure no deformation has occurred during testing process that may lead into eventual leakage of the coupler.

Temperature Test

A temperature test may be conducted upon a specimen of an SMA coupler design, and more particularly a test assembly including a specimen of an SMA coupler design, in accordance with one or more embodiments of the present disclosure. For example, a temperature test may be conducted using a configuration of a test assembly similar to that shown in FIG. 3. In one or more embodiments, during a temperature test, the test assembly may be connected to a hydraulic fluid pressure source and mounted or contained within an environmental chamber. Pressurized fluid may then be admitted to the test assembly and increased to 1000 psi minimum, with the ambient temperature raised to 400° F. After temperature stabilization, continue to hold at this temperature for a minimum of two hours. The test pressure during this period may remain at a minimum of 1000 psi with the test assembly checked for leakage. After soaking at 400° F., the test assembly may be maintained pressurized at 1000 psi minimum, and the temperature may be lowered to below −65° F. After stabilization, continue to hold at that temperature for a minimum of two hours. The test pressure during this period may remain at a minimum of 1000 psi and the assembly may be checked for leakage. After soaking at −65° F., the test assemblies may be maintained pressurized at 1000 psi minimum with the temperature raised back to ambient temperature. The temperature test equipment may include a temperature chamber, a pressure gage, a hydraulic pump, and/or a pressure relieve valve. To be accepted and/or pass the temperature test, no fluid leakage may be observed during the temperature test period. The coupler and/or test assembly may be dimensionally checked (e.g., length & outer diameter) to ensure no deformation has occurred during testing process that may lead into eventual leakage of the coupler. After dimensional check, the coupler may be X-Ray or ultrasonic testing (UT) examined to verify no cracks or deformations of any type have developed to cause detrimental effect on the life of the coupler and joints during service.

Shock Test

A shock test may be conducted upon a specimen of an SMA coupler design, and more particularly a test assembly including a specimen of an SMA coupler design, in accordance with one or more embodiments of the present disclosure. For example, a shock test may be conducted using a configuration of a test assembly similar to that shown in FIG. 3, and in one or more embodiments, the shock test may be conducted in accordance with the specifications of MIL-S-901 for Grade A, Class I, Hull-mounted equipment without leakage. After hydraulic proof testing, the test assembly may be mounted on a suitable platform and shock tested in accordance with MIL-S-901, while pressurized to operating pressure. Subsequent to shock testing, the test assembly may be pressurized to proof pressure and observed for leakage. To be accepted and/or pass the shock test, no leakage may be observed coming from the test assembly during the test period. In addition, the coupler and/or test assembly may be dimensionally checked (e.g., length & outer diameter) to ensure no deformation has occurred during testing process that may lead into eventual leakage of the coupler.

Vibration Test

A vibration test may be conducted upon a specimen of an SMA coupler design, and more particularly a test assembly including a specimen of an SMA coupler design, in accordance with one or more embodiments of the present disclosure. For example, a vibration test may be conducted using a configuration of a test assembly similar to that shown in FIG. 3, and in one or more embodiments, the vibration test may be conducted in accordance with the specifications of MIL-STD-167-1 without leakage. The test assembly may be mounted on a suitable platform and shock tested in accordance with MIL-STD-167-1, while pressurized to operating pressure. Subsequent to shock testing, the test assembly may be pressurized to proof pressure and observed for leakage.

In one or more embodiments, a shock test may be used to expose a specimen to vibration magnitudes in prescribed frequency and amplitude range to reveal any critical response prominences or potential deficiencies, and further may expose the specimen to a two-hour minimum endurance test at the response prominence frequency or frequencies most seriously affecting the functional and/or structural integrity of the coupler or specimen. A vibration test may use equipment in accordance with MIL-STD-167-1 and the additional requirements contained herein. Equipment, such as controllers and other appropriate devices, may be provided for controlling the direction of vibration of the testing machine and for adjusting and measuring the frequencies and amplitude of vibration to maintain prescribed limits. It may be acceptable to utilize different machines for the vertical and horizontal directions. The testing machine, including the table, actuator, and attachment fixtures, may be rigid within the frequency range to be tested. This includes test fixture resonances that may result from interaction between the table and mounted equipment.

To be accepted and/or pass the vibration test, no leakage may be observed coming from the test assembly during the test period. In addition, the coupler and/or test assembly may be dimensionally checked (e.g., length & outer diameter) to ensure no deformation has occurred during testing process that may lead into eventual leakage of the coupler. After the dimensional check (e.g., test), the coupler may be X-Ray or ultrasonic testing (UT) examined to verify no cracks or deformations of any type have developed to cause detrimental effect on the life of the coupler and joints during service. Further, shock and vibration tests may be combined in one or more embodiments.

Proof Pressure Test

A proof pressure test may be conducted upon a specimen of an SMA coupler design, and more particularly a test assembly including a specimen of an SMA coupler design, in accordance with one or more embodiments of the present disclosure. For example, a proof pressure test may be conducted using a configuration of a test assembly similar to that shown in FIG. 3, and in one or more embodiments, the proof pressure test may be conducted in accordance with the specifications of ABS Part 4, Section 4-6-2/5.9.2(e)v)1. The specimen may be tested at proof pressure for a minimum of 30 minutes without leakage, permanent deformation, or other malfunction. In one or more embodiments, the specimen and test assembly may be connected to a pressure source with one end unrestrained. Using MIL-PRF-83282 hydraulic fluid, the test specimen may be initially pressurized to 100 psi and held for a period of five minutes. The specimen may be examined and an internal pressure may be applied at a rate of 20,000 psi/min±5,000 psi/min to achieve the proof pressure. Proof pressure may be held for five minutes then released. The test assembly may then be examined for indications of leakage, deformation or other malfunction. The proof pressure test may be performed on a static pressure test stand capable of achieving and maintaining 15,000 psi. The pressure may be indicated on a calibrated gage with 1 psi increments. To be accepted and/or pass the proof pressure test, no leakage may be observed coming from the test assembly during the test period. In addition, the coupler and/or test assembly may be dimensionally checked (e.g., length & outer diameter) to ensure no deformation has occurred during testing process that may lead into eventual leakage of the coupler.

Flexure Fatigue Test

A flexure fatigue test may be conducted upon a specimen of an SMA coupler design, and more particularly a test assembly including a specimen of an SMA coupler design, in accordance with one or more embodiments of the present disclosure. For example, a flexure fatigue test may be conducted using a configuration of a test assembly similar to that shown in FIG. 4, and in one or more embodiments, the flexure fatigue test may be conducted to a minimum endurance flexure fatigue in accordance with the specifications of ABS Part 4, Section 4-6-2/5.9.2 (e)v)2 or Rotational Flexure Testing in accordance with SAE ARP 1185 (Flexure Testing of Hydraulic Tubing Joints and Fittings). A test assembly or specimen may be subjected to 10,000,000 cycles or more with frequency 20-50 Hz without leakage or damage, deformation, or other malfunction.

A test assembly may be subjected to flexure using a cantilever beam method. The test may be conducted at ambient conditions throughout the testing period. The flexure test machine may subject each sample to a displacement as a cantilever beam with the coupler being tested at, adjacent, or otherwise close to the fixed end of the test assembly. The displacement cycles may be continuously applied, and one cycle may consist of an excursion from a neutral position (zero strain) to the maximum positive strain position, to the maximum negative strain position, and return to the neutral position. Maximum positive strain and maximum negative strain may be equal to within 2%. Strain gages may be placed on the axis of deflection, adjacent to the tail end of the coupler being tested, and within 0.18 inches from the tail of the coupler. The test specimen may be installed in the flexure test machine and the displacement adjusted to the calculated strain levels of tension and compression. The strain may also be calculated with no internal pressure applied. A total axial stress of 18,000 psi may be maintained throughout the test. The highest of the two strain readings, tension and compression for the strain gage, may be used to measure stress. The flexure fatigue test may be conducted at the operating pressure, and a proof pressure test may be conducted after successful completion of the flexure fatigue test.

A flexure test apparatus may include a hydraulic pressure system capable of exuding internal pressures of 10,000 psi within the test assembly, and may include a manifold with the test assembly fixed to the manifold. The hydraulic system may include a pressure switch that may turn off electrical power to the test apparatus in the event of a loss of pressure loss in the system (e.g., sample failure). The pressure may be indicated on a 0-10,000 psi pressure gage with 100 psi increments or better on the test apparatus. To be accepted and/or pass the flexure fatigue test, no leakage may be observed coming from the test assembly during the test period. In addition, the coupler and/or test assembly may be dimensionally checked (e.g., length & outer diameter) to ensure no deformation has occurred during testing process that may lead into eventual leakage of the coupler. After the dimensional check (e.g., test), the coupler may be X-Ray or ultrasonic testing (UT) examined to verify no cracks or deformations of any type have developed to cause detrimental effect on the life of the coupler and joints during service.

Impulse Pressure Test

Figure 5:
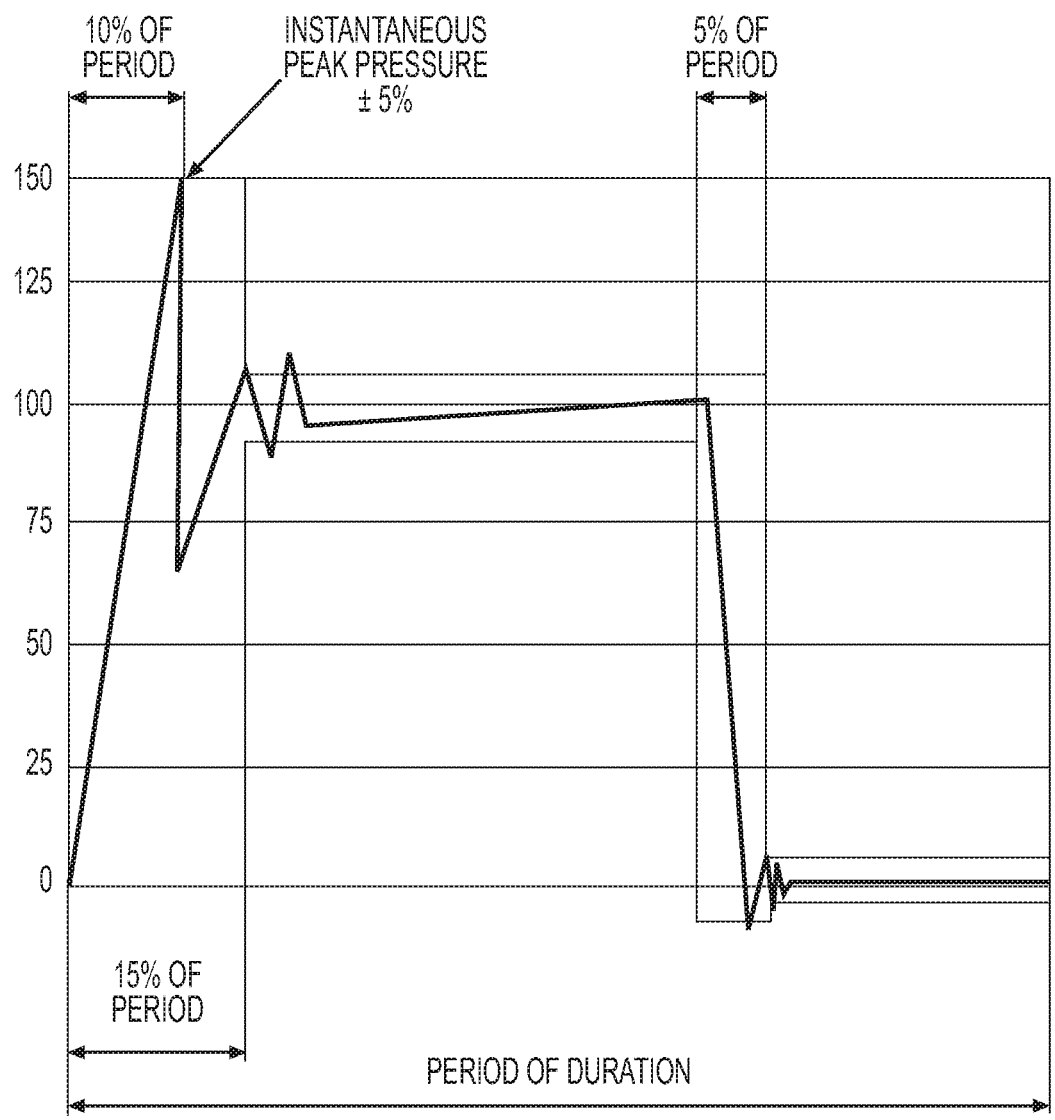
FIG. 5 shows an example of a pressure cycle of an impulse pressure test for a test assembly in accordance with one or more embodiments of the present disclosure.

An impulse pressure test may be conducted upon a specimen of an SMA coupler design, and more particularly a test assembly including a specimen of an SMA coupler design, in accordance with one or more embodiments of the present disclosure. For example, an impulse pressure test may be conducted using a configuration of a test assembly similar to that shown in FIG. 4. The impulse pressure test may be conducted after the hydrostatic proof test in one or more embodiments, and during the impulse pressure test, a test assembly may be subjected to a minimum of 500,000 impulse pressure cycles in accordance with a pressure cycle as shown in FIG. 5. For example, a pressure cycle may be imparted to exert a peak pressure of about 50% of the operating pressure with a back pressure of 20% of the operating pressure. The waveform of the pressure cycle may be displayed on an oscilloscope and monitored throughout the test. The waveform (damped wave) may be conducted in accordance with ABS Part 4, Section 4-6-2/5.9.2(e)v)3. FIG. 5 may provide additional information regarding impulse pressure parameter for a pressure cycle.

During the testing procedure, the cycling rate may not exceed 100 (preferably 30 thru 100) cycles per minute, with each cycle defined as a rise from the back pressure, to the peak pressure, to the operating pressure, and then to the back pressure. The test may be conducted at ambient temperature. After the completion of the impulse pressure test, the test specimens may be subjected to a proof pressure test. The impulse pressure test may be conducted using a hydraulic impulse machine conforming to AIR1228. The test apparatus may include a hydraulic power unit, a test chamber, and a control panel. The peak pressure, the rate of pressure rise, and the cycle rate may be regulated or controlled through the control panel. A transducer may be mounted near a test manifold to send an electronic signal to an oscilloscope to display the waveform. A series of limit switches may monitor the fluid level in the hydraulic power unit and test chamber and may be used to stop the test apparatus in the event of fluid loss or test assembly failure. To be accepted and/or pass the impulse pressure test, no leakage may be observed coming from the test assembly during the test period. In addition, the coupler and/or test assembly may be dimensionally checked (e.g., length & outer diameter) to ensure no deformation has occurred during testing process that may lead into eventual leakage of the coupler.

Burst Pressure Test

A burst pressure test may be conducted upon a specimen of an SMA coupler design, and more particularly a test assembly including a specimen of an SMA coupler design, in accordance with one or more embodiments of the present disclosure. For example, a burst pressure test may be conducted using a configuration of a test assembly similar to that shown in FIG. 4, and in one or more embodiments, may be conducted in accordance with ABS Part 4, Section 4-6-2/5.9.2(e)v)4. The test assemblies may be subjected to the burst pressure and/or as defined below for a minimum of five minutes. Permanent deformation of the test assembly may be observed, such as during the testing period.

If the test assembly bursts at a pressure lower than the burst pressure, the test assembly or specimen will not necessarily be defined as a failure for not passing the burst pressure test. MIL-T-16420, paragraph 4.4.3 only requires a test assembly or a conduit to withstand a pressure of 165% of operating. As such, for an operating pressure of 6,000 psi, the conduit or pipe would be allowed to burst or fail at 9,900 psi. The test assembly may be connected to a pressure source with one end unrestrained. The burst pressure test may be conducted at ambient temperature. Using MIL-H-83282 hydraulic fluid, internal pressure may be applied at a rate of 20,000 psi/min±5,000 psi/min to achieve 80% of the burst pressure and then 90% of the burst pressure. At each pressure level, a five minute time may be sustained to verify that no fluid leakage, with the condition of the test assembly potentially examined for any deformation, cracks, and other detrimental conditions that may lead into to bursting or failure of the test assembly. Following five minutes of sustaining 90% of the burst pressure with no leakage, the pressure may be increased at the rate previously specified until the test assembly fails. Following failure, the test assembly may be examined and the type of failure determined (e.g., failure of the coupler and/or the conduits).

The burst pressure test may be performed on a static pressure test stand capable of achieving and maintaining 30,000 psi. The pressure may be indicated on a calibrated gage. In one or more embodiments, to be accepted and/or pass the burst pressure test, no fluid leakage may be observed at 80% and/or 90% of the burst pressure for the test assembly. At these two pressure settings, the test assembly may be visually inspected, such as using remote camera, with the amount of deformation, cracking, or over-stressing during the testing process recorded. Then, the test assembly may be further pressurized until the first sign of leakage is observed, with this pressure recorded as the failure pressure. If the failure pressure is lower than 95% of the burst pressure, then the tabulated burst pressure may be revised to the lower failure pressure. Further, the proof pressure and/or the operating pressure may also be updated accordingly, such as based upon the predefined ratios defined above.

Coupler Tensile Test

A coupler tensile test may be conducted upon a specimen of an SMA coupler design, and more particularly a test assembly including a specimen of an SMA coupler design, in accordance with one or more embodiments of the present disclosure. For example, a coupler tensile test may be conducted using a configuration of a test assembly similar to that shown in FIG. 4. During the coupler tensile test, a test assembly may be subjected to a tensile load to determine the load required to pull out the pipe from the coupler of the test assembly. The test assembly may be mounted in a tensile test machine, may be tested in accordance with ABS Part 4, Section 4-6-2/5.9.2(e)v)5, and may have a head travel rate of 0.15 in/min+/−0.05 in/min. The test specimen may be pressurized to the operating pressure as well. In one or more embodiments, for a tube of a test specimen having an outer diameter of about 0.25 in, a tensile load of about 264 lbs may be applied to the test specimen. For a tube of a test specimen having an outer diameter of about 0.75 in, a tensile load of about 2,384 lbs may be applied to the test specimen. Further, for a tube of a test specimen having an outer diameter of about 1.5 in, a tensile load of about 9,538 lbs may be applied to the test specimen.

The coupler tensile test may be performed on a tensile tester capable of applying a load greater than the required load defined as above. The tensile tester may have a chart recorder to record the entire test, including the maximum load and failure load for the test specimen. In one or more embodiments, to be accepted and/or pass the coupler tensile test, no fluid leakage may be observed at 80% and/or 90% of the tensile load for the test assembly. At these two loads, the test assembly may be visually inspected, such as using remote camera, with the amount of deformation (e.g., elongation), cracking, or over-stressing during the testing process recorded. Then, the test assembly may be further tensile loaded until the first sign of leakage is observed, with this pressure recorded as the failure pressure. If the failure load is lower than 95% of the tensile load defined above, then the tabulated tensile load may be revised to the lower tensile load.

Material Tensile Test

A material tensile test may be conducted using material of an SMA coupler in accordance with one or more embodiments of the present disclosure. For example, a tensile test specimen, which may be a standardized sample cross-section specimen, may be subjected to a tensile material test in accordance with the requirements of 10.4.5, 10.4.6 of Specification API 5CT, ISO 6892-1. The strain rate used during tensile testing may be in accordance with the requirements of ISO 6892-1 or ASTM A370.

The product-body tensile test specimens may be full-section specimens, strip specimens, or round bar specimens, at the option of the manufacturer. For example each strip specimen may be about 12 inches in length and about 0.5 inches in outer diameter. The strain rate may be approximately 50,000 psi/minute, or may otherwise be conducted in accordance with the requirements of ISO 6892-1 or ASTM A370. As the elongation is documented, the data may show the nominal width of the tensile test specimen when strip specimens are used.

Any test specimen that shows defective preparation or material imperfections unrelated to the intent of the test, whether observed before or after testing, may be discarded and be replaced by another specimen from the same length of product. The tensile test machines may be calibrated within 15 months prior to any test conducted in accordance with the present disclosure and/or in accordance with the procedures of ISO 7500-1 or ASTM E4. Further, extensometers may be calibrated within 15 months prior to any test conducted in accordance with the present disclosure and/or in accordance with the procedures of ISO 7500-1 or ASTM E4. The tensile test specimens may then be examined for cracks, deformation, and other failures to assure that the material for an SMA coupler is in accordance with the regulated standards and/or predicted properties for the material. Further, tensile test specimens may deform during sulfide cracking tests.

Galvanic Corrosion Test

A galvanic corrosion test may be conducted upon a specimen of an SMA coupler design, and more particularly a test assembly including a specimen of an SMA coupler design, in accordance with one or more embodiments of the present disclosure. For example, a galvanic corrosion test may be conducted using a configuration of a test assembly similar to that shown in FIG. 4, and in one or more embodiments, the galvanic corrosion test may be conducted in accordance with ASTM G71. The test assembly may be subjected to immersion tests in accordance with ASTM G71 and may be exposed for 30 days. The specimen may be sized to approximate the actual exposed surface area ratio between the metals within the test assembly. Further, the test may be conducted in synthetic seawater at laboratory ambient temperature, unless otherwise specified. The immersed specimens may then be evaluated for mass loss and visual indication of localized corrosion, with particular attention to the areas of contact between the metals of the test specimen.

Salt Spray Test

A salt spray test may be conducted upon a specimen of an SMA coupler design, and more particularly a test assembly including a specimen of an SMA coupler design, in accordance with one or more embodiments of the present disclosure. For example, a salt spray test may be conducted using a configuration of a test assembly similar to that shown in FIG. 4, and in one or more embodiments, the test may be conducted in accordance with ASTM B117. The test assembly may be subjected to immersion tests in accordance with ASTM B117 and may be exposed for a period of 96 hours within a salt spray tank, cabinet, or device. The test may be conducted in synthetic seawater at laboratory ambient temperature, unless otherwise specified. The immersed specimens may then be evaluated for mass loss and visual indication of localized corrosion, with particular attention to the areas of contact between the metals of the test specimen. As such, a salt spray test may be used to determine if an SMA coupler design may be used within a subsea environment, whereas a galvanic corrosion test may be used to determine if material of an SMA coupler design is compatible with materials that are in use with the SMA coupler design.

Dimensional Test

A dimensional test may be conducted upon a specimen of an SMA coupler design, and more particularly a test assembly including a specimen of an SMA coupler design, in accordance with one or more embodiments of the present disclosure. For example, a dimensional test may be conducted using a configuration of a test assembly similar to that shown in FIGS. 2-4, and in one or more embodiments, a dimensional test may be conducted before or after any of the identified tests. As such, during the test, one or more dimensions may be recorded, such as recorded to two decimal places. For example, an outside diameter, wall thickness, and/or length of each coupler may be recorded where applicable. The dimensions may then be accepted if within a predetermined range and/or tolerance.

Visual Inspection Test

A visual inspection test may be conducted upon a specimen of an SMA coupler design, and more particularly a test assembly including a specimen of an SMA coupler design, in accordance with one or more embodiments of the present disclosure. For example, a visual inspection test may be conducted using a configuration of a test assembly similar to that shown in FIGS. 2-4. The test may be conducted by trained personnel with satisfactory visual acuity to detect surface imperfections. The minimum illumination level at the inspection surface may be 500 flux (50 foot-candles). A coupler or test assembly may be visually inspected over the entire outside surface for any imperfections. Any imperfections, such as scratches and/or dings, may be documented. As such, to pass or be approved through the visual inspection test, no dings and/or scratches around the external surfaces of the couplers.

Non-Destructive Examination Test

A non-destructive examination test may be conducted upon a specimen of an SMA coupler design, and more particularly a test assembly including a specimen of an SMA coupler design, in accordance with one or more embodiments of the present disclosure. For example, a non-destructive examination test may be conducted using a configuration of a test assembly similar to that shown in FIG. 4, and in one or more embodiments, the test may be in accordance with Section 10.15 of Specification API 5CT and/or ISO 9303 or ASTM E213. The non-destructive examination test may use ultrasonic technology and/or digital radiography can be used as an alternative.

The test assembly and/or coupler may be inspected for the detection of longitudinal and transverse imperfections on the outside surface, inside surface, and/or through-wall, such as to acceptance level L2 using ultrasonic tests. In one or more embodiments, the test assembly may be inspected full-body and/or full-length from the outside surface using ultrasonic compression wave techniques to detect and identify imperfections. The reference standard may be a 6.4 mm (0.25 in) flat bottomed round hole from the inside surface and the coverage may be 100% of the inspected surface. The coupler may be inspected for longitudinal and/or transverse imperfections on the inside surface using ultrasonic shear-wave techniques to acceptance level L3 with a maximum notch length of 25 mm (1 in).

The testing equipment may include one or more reference indicators used to calibrate the compression and shear wave ultrasonic equipment and may be retained in the test assembly and/or coupler. If the reference indicators are retained, the outside wall surface of the test assembly and/or coupler adjacent to the reference indicators may be stenciled with the letters "RI". The reference indicators may be considered defects.

Digital radiography may be used in addition or in alternative to ultrasonic testing. Digital radiography may be used to identify cracks or damage caused by the crimping of the swage fitting upon a tube of the test assembly. A test assembly may be inspected full-body and/or full-length from the outside surface using digital radiography, with defects then being documented. Digital radiography may include a digital radiography plate that includes an array of amorphous silicon (a-Si) detectors, such as to improve the speed at which an image can be created and seen by the operator. Typical equipment to be used for digital radiography may include an X-Ray Tube, a DR Detector, and a computer.

As discussed above, one or more embodiments of an SMA coupler in accordance with the present disclosure may be tested and/or approved for use within an oil and gas environment. For example, one or more of the above tests and/or testing sequences may be used for an application within the oil and gas environment. The conditions and environments experienced within the oil and gas industry may be extreme and in remote locations, such as more so than those found or experienced within other industries (e.g., the aerospace or automotive industries). As such, the testing and approval process for qualifying an SMA coupler for use within an oil and gas environment, as discussed above, may be even more rigorous than that of other industries.

In one or more embodiments, an SMA coupler in accordance with the present disclosure may be used to carry or transport hydraulic fluid (e.g., liquid) for hydraulic control purposes within equipment or devices that are used on subsea, on the surface, and/or during drilling. Thus, examples of such equipment and devices may include hydraulic power units, fluid mixing units, diverter control units, accumulator racks, subsea control pods, completion equipment, in addition to other devices used within subsea and/or surface environments.

Although the present invention has been described with respect to specific details, it is not intended that such details should be regarded as limitations on the scope of the invention, except to the extent that they are included in the accompanying claims.

What is claimed is:

1. A method of testing a shape-memory alloy (SMA) coupler for use within an oil and gas environment at an operating pressure, the method comprising:
   testing a first specimen of an SMA coupler design for the operating pressure according to a first test sequence comprising a first plurality of tests;
   testing a second specimen of the SMA coupler design for the operating pressure according to a second test sequence comprising a second plurality of tests, the first test sequence being different than the second test sequence;
   testing a third specimen of the SMA coupler design for the operating pressure according to a third test sequence, the third test sequence comprising a third plurality of tests, the third test sequence being different than the first test sequence and the second test sequence;
   testing a fourth specimen of the SMA coupler design for the operating pressure according to a fourth test sequence, the fourth test sequence comprising a gas leak test, a temperature test, and a galvanic corrosion test;
   testing a fifth specimen of the SMA coupler design for the operating pressure according to a fifth test sequence, the fifth test sequence comprising a gas leak test, a shock test, a vibration test, and a non-destructive examination test; and
   approving the SMA coupler design for use within an oil and gas application at the operating pressure if the first specimen passes each test of the first test sequence, the second specimen passes each test of the second test sequence, the third specimen passes each test of the third test sequence, the fourth specimen passes each test of the fourth test sequence, and the firth specimen passes each test of the fifth test sequence.

2. The method of claim 1, wherein the first plurality of tests and the second plurality of tests comprise different tests and each comprise at least two of a hydrostatic proof test, a temperature test, a gas leak test, a shock test, a vibration test, a proof pressure test, a flexure fatigue test, an impulse pressure test, a burst pressure test, a coupler tensile test, a material tensile test, a galvanic corrosion test, a salt spray test, a dimensional test, a visual inspection test, and a non-destructive examination test.

3. The method of claim 1, wherein the first plurality of tests comprises a gas leak test, a proof pressure test, a flexure fatigue test, and a non-destructive examination test.

4. The method of claim 3, wherein the second plurality of tests comprises a gas leak test and a coupler tensile test.

5. The method of claim 1, wherein the third plurality of tests comprises a gas leak test, a hydrostatic proof test, an impulse pressure test, and a burst pressure test.

6. The method of claim 1, wherein one of the testing the first specimen and the testing the second specimen comprises testing at the operating pressure, a proof pressure, and a burst pressure with the burst pressure larger than the proof pressure and the proof pressure larger than the operating pressure.

7. The method of claim 6, wherein the proof pressure is about 1.5 times that of the operating pressure, and wherein the burst pressure is between about 3 times and 4 times that of the operating pressure.

8. The method of claim 1, wherein one of the testing the first specimen and the testing the second specimen comprises testing at a temperature range between about −65° F. (−54° C.) and 400° F. (205° C.).

9. The method of claim 1, wherein the approving the SMA coupler design for use within an oil and gas application at the operating pressure comprises approving the SMA coupler design for transporting hydraulic fluid within an oil and gas application at the operating pressure.

10. A method of testing a shape-memory alloy (SMA) coupler for use within an oil and gas environment at an operating pressure, the method comprising:
   testing a plurality of specimens of an SMA coupler design for the operating pressure according to a plurality of test sequences with each of the plurality of test sequences being different from each other, the plurality of test sequences comprising:
      a first test sequence comprising a first plurality of tests,
      a second test sequence comprising a second plurality of tests,
      a third test sequence comprising a third plurality of tests,
      a fourth test sequence comprising a gas leak test, a temperature test, and a galvanic corrosion test, and
      a fifth test sequence comprising a gas leak test, a shock test, a vibration test, and a non-destructive examination test; and
   approving the SMA coupler design for use within an oil and gas application at the operating pressure if each of the plurality of specimens pass each test of the plurality of test sequences.

11. The method of claim 10, wherein the testing the plurality of specimens comprises testing at the operating pressure, a proof pressure, and a burst pressure with the burst pressure larger than the proof pressure and the proof pressure larger than the operating pressure.

12. The method of claim 10, wherein the testing the plurality of specimens comprises testing at a temperature range between about −65° F. (−54° C.) and 400° F. (205° C.).

13. The method of claim 10, wherein:
   the first plurality of tests comprises a gas leak test, a proof pressure test, a flexure fatigue test, and a non-destructive examination test;
   the second plurality of tests comprises a gas leak test and a coupler tensile test; and
   the third plurality of tests comprises a gas leak test, a hydrostatic proof test, an impulse pressure test, and a burst pressure test.

14. A method of testing a shape-memory alloy (SMA) coupler for use within an oil and gas environment at an operating pressure, the method comprising:
   testing a plurality of specimens of an SMA coupler design at the operating pressure, a proof pressure, and a burst pressure according to a plurality of test sequences, the plurality of test sequences each different from each other with the burst pressure larger than the proof pressure and the proof pressure larger than the operating pressure, and the plurality of test sequences comprising:
      a first test sequence comprising a first plurality of tests,
      a second test sequence comprising a second plurality of tests,
      a third test sequence comprising a third plurality of tests,
      a fourth test sequence comprising a gas leak test, a temperature test, and a galvanic corrosion test, and
      a fifth test sequence comprising a gas leak test, a shock test, a vibration test, and a non-destructive examination test; and
   approving the SMA coupler design for transporting hydraulic fluid within an oil and gas application at the operating pressure if each of the plurality of specimens pass each test of the plurality of test sequences.

15. The method of claim 14, wherein the proof pressure is about 1.5 times that of the operating pressure, and wherein the burst pressure is between about 3 times and 4 times that of the operating pressure.

* * * * *